United States Patent [19]

Bahorich

[11] Patent Number: 5,226,019
[45] Date of Patent: Jul. 6, 1993

[54] METHOD OF GEOPHYSICAL EXPLORATION

[75] Inventor: Michael S. Bahorich, Tulsa, Okla.

[73] Assignee: Amoco Corporation, Chicago, Ill.

[21] Appl. No.: 821,721

[22] Filed: Jan. 10, 1992

[51] Int. Cl.$^5$ .............................................. G01V 1/30
[52] U.S. Cl. ........................................ 367/74; 367/38
[58] Field of Search ..................... 367/38, 47, 48, 49, 367/59, 70, 74; 364/421

[56] References Cited

U.S. PATENT DOCUMENTS

| | | | |
|---|---|---|---|
| 3,899,768 | 8/1975 | Quay | 367/68 |
| 4,633,447 | 12/1986 | Bodine | 367/70 |
| 4,779,237 | 10/1988 | Bodine | 367/47 |

OTHER PUBLICATIONS

Taner et al., "Complex Seismic Trace Analysis," Geophysics, vol. 44, pp. 1041–1063 (1979).
Roy E. White, "Properties of Instantaneous Seismic Attributes," Geophysics, pp. 26–32, (Jul. 1991).
Lendzionowski et al., "Seismic Character Mapping Over Reservoir Intervals," Geophysical Prospecting, vol. 38, #8, Nov. 1990.

*Primary Examiner*—Ian J. Lobo
*Attorney, Agent, or Firm*—James A. Gabala; Richard A. Kretchmer; Frank J. Sroka

[57] ABSTRACT

An improved method of stratigraphic analysis of geophysical data is provided. In one embodiment seismic data are transformed into one or more instantaneous attributes descriptive of the wave-like nature of the seismic signals comprising the seismic data. A stratum in the earth's subsurface, having both lateral and vertical extent, is defined on the seismic data. The instantaneous attributes within the stratum can thereafter be transformed into a descriptor statistically representative of changes in the formation materials comprising the stratum. The descriptor can then be plotted in both cross-sectional and plan view so as to identify and characterize both lateral and vertical variations in the lithology, geology and pore fluid content of the formation materials comprising the stratum.

16 Claims, 8 Drawing Sheets

METHOD OF GEOPHYSICAL EXPLORATION

BACKGROUND OF THE INVENTION

The present invention relates generally to an improved method of geophysical exploration and more specifically to an improved method of stratigraphic analysis for identifying and characterizing changes in geology, lithology, and pore fluid content of the formation materials comprising a stratum in the earth's subsurface.

In the continuing search for hydrocarbons in the earth, geophysicists seek methods for evaluating and interpreting the structure of the earth's subsurface formations as well as the effects of geology, lithology, and pore fluid content on geophysical data in order to relate such affects to the occurrence or presence of hydrocarbons. By way of example, exploration geophysicists have developed numerous techniques for imparting seismic wave energy into the earth's subterranean formations; recording the returning reflected seismic wave energy and processing the recorded seismic wave energy to produce seismic signals or traces. Such seismic signals or traces contain a multiplicity of information, for example frequency, amplitude, phase, etc., which can be related to geology, lithology or pore fluid content of the earth's subsurface formations. Such features of the seismic signals are generally referred to as instantaneous attributes. Additionally, interpretative techniques generally referred to as stratigraphic interpretative analysis have been developed for analyzing seismic data and for identifying and characterizing changes in lithology, geology and pore fluid content of the earth's subsurface formations from recurring patterns of instantaneous attribute associated with reflection events in seismic data. Exemplary of such focus are Quay et al. in U.S. Pat. No. 3,899,768 and Bodine in U.S. Pat. No. 4,779,237.

In spite of such developments, stratigraphic analysis of seismic data can be fraught with serious limitations. Most notable of such limitations is the overwhelming volume of instantaneous attributes which an explorationists is confronted with. A first attempt to lessen the volume of instantaneous attributes is described by Bodine in U.S. Pat. No. 4,633,447. Bodine describes a technique whereby a selected instantaneous attribute is chosen to represent an entire wavelet or reflection event. While such approach can reduce the volume of instantaneous attributes, such an approach results in a display of attributes which characterizes differences in adjacent formations represented by each reflection event. Additionally, due to noise and other contaminating features within the recorded seismic signals, the need for true amplitude seismic data, and the resolving power of seismic waves in the 5-200 Hz range, the information conveyed by individual reflection events, and hence the instantaneous attributes, within a stratum can fail to provide an accurate description of changes in the lithology, geology, or pore fluid content thereof.

In light of these difficulties, the present invention provides a novel method of stratigraphic analysis to overcome certain of its known limitations and to better aid the geophysicists in identifying and characterizing subtle changes in the geology, lithology and pore fluid content of formation materials comprising a stratum in the earth's subsurface.

SUMMARY OF THE INVENTION

The present invention relates generally to an improved method of geophysical exploration and more particularly to an improved method of stratigraphic analysis of geophysical data for evaluating changes in lithology, geology, and pore fluid content of subsurface formation materials represented by the geophysical data. In one embodiment, seismic data are transformed into one or more instantaneous attributes quantitatively descriptive of the wave-like nature of the seismic signals comprising the seismic data. A stratum of the earth's subsurface, having both lateral and vertical extent, is defined on the seismic data. The instantaneous attributes within the stratum can thereafter be transformed into a descriptor statistically representative of the formation materials comprising the stratum in the earth's subsurface. The descriptor can also be plotted in both a cross-sectional and plan view map so as to identify and characterize both lateral and vertical variations in the lithology, geology and pore fluid content of the formation materials comprising the stratum. These and other benefits will be better understood with reference to the detailed description below and the accompanying figures.

DETAILED DESCRIPTION OF THE INVENTION

In order to better understand the present invention, the following introductory comments are provided. Geophysical data, and seismic data in particular, generally comprise a plurality of time-series signals from which explorationists can extract information about the earth's structure, lithology, geology, and pore fluid content. Those skilled in the geophysical arts will appreciate that such geophysical data can also be represented by signals which are functions of either frequency or depth.

Originally, seismic data were employed for the limited purpose of ascertaining formation structure from displays of seismic data. Starting with the work of Taner et al. in "Complex Seismic Trace Analysis," Geophysics, Volume 44, p. 1041-1063 (1979), explorationists have developed a plurality of time-series transformations of the seismic data to obtain a variety of instantaneous attributes which provide quantitative measures of the wave-like nature of the seismic signals comprising the seismic data. Such attributes are said to be instantaneous because values for the attributes are generally obtained for each data point in the seismic data or within a small time window of datapoints (e.g., a few milliseconds). By overlaying such instantaneous attributes on displays of the seismic data, explorationists have employed such instantaneous attributes to characterize and identify changes in lithology, geology, and pore fluid content associated with individual reflection events in the seismic data. Analysis of recurring patterns of instantaneous attributes associated with reflection events in the seismic data is generally referred to as stratigraphic interpretation or analysis.

In spite of recent developments, stratigraphic interpretation or analysis of seismic data still depends upon the extraction of qualitative information from the seismic data by an interpreter. Additionally, the volume of instantaneous attributes obtained from the seismic data can overwhelm the explorationist with quantitative measures of changes in the earth's formations represented by reflection events in the seismic signals comprising the seismic data. Moreover, the use of instantaneous attributes as descriptive of formation materials at a particular depth can be misleading because of the long wavelength nature of seismic energy (i.e., individual reflection events, and hence instantaneous attributes, in fact do not represent the properties of the earth at a particular depth, but rather, can represent the properties of hundreds of feet of formation materials on either side thereof). For all of the above reasons, explorationists oftentimes fail to identify and characterize subtle changes in the earth's formations lithology, geology, and pore fluid content represented in conventional displays of instantaneous attributes and upon which can depend the key to successful exploration.

Figure 1:
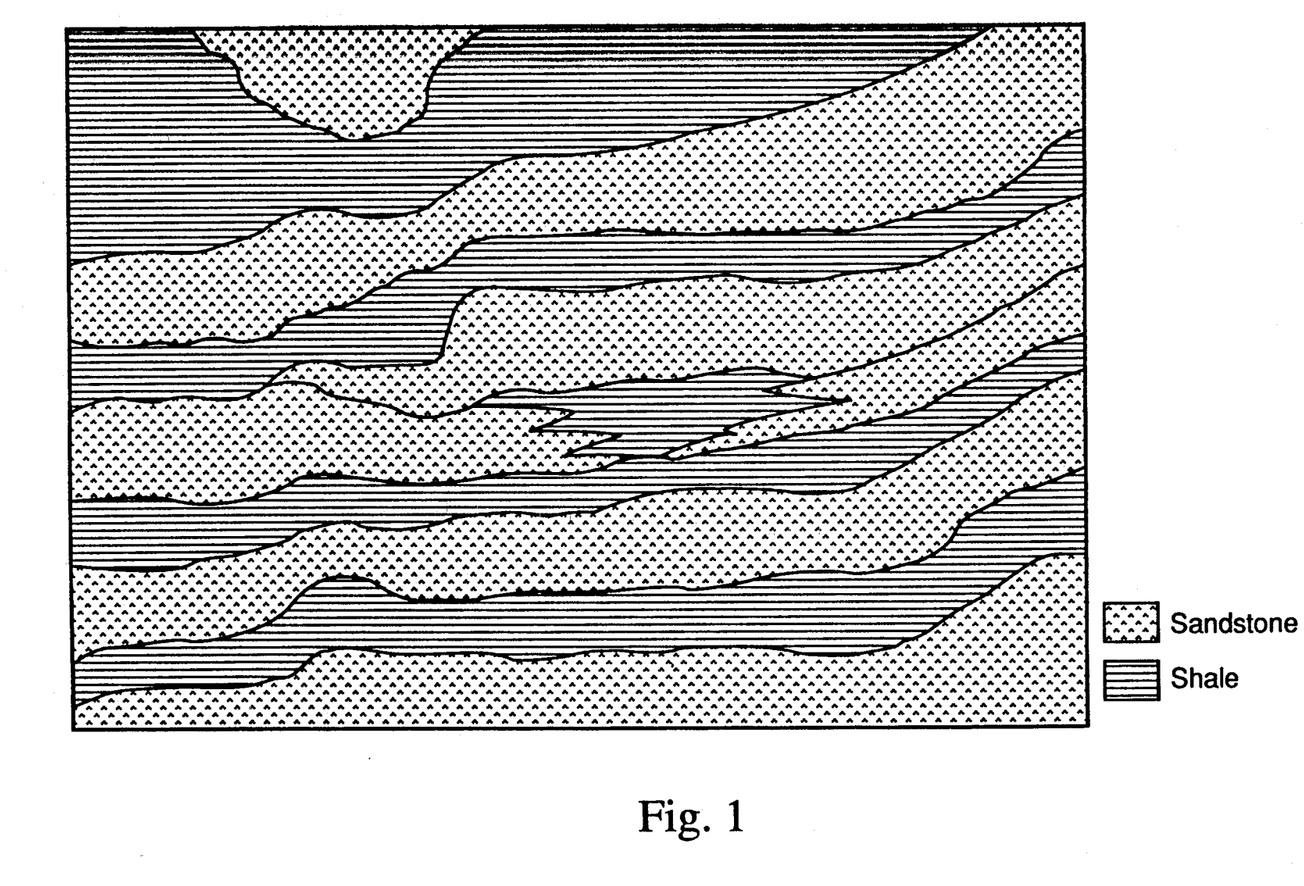
FIG. 1 is a stratigraphic model of the earth's subsurface.
Figure 2:
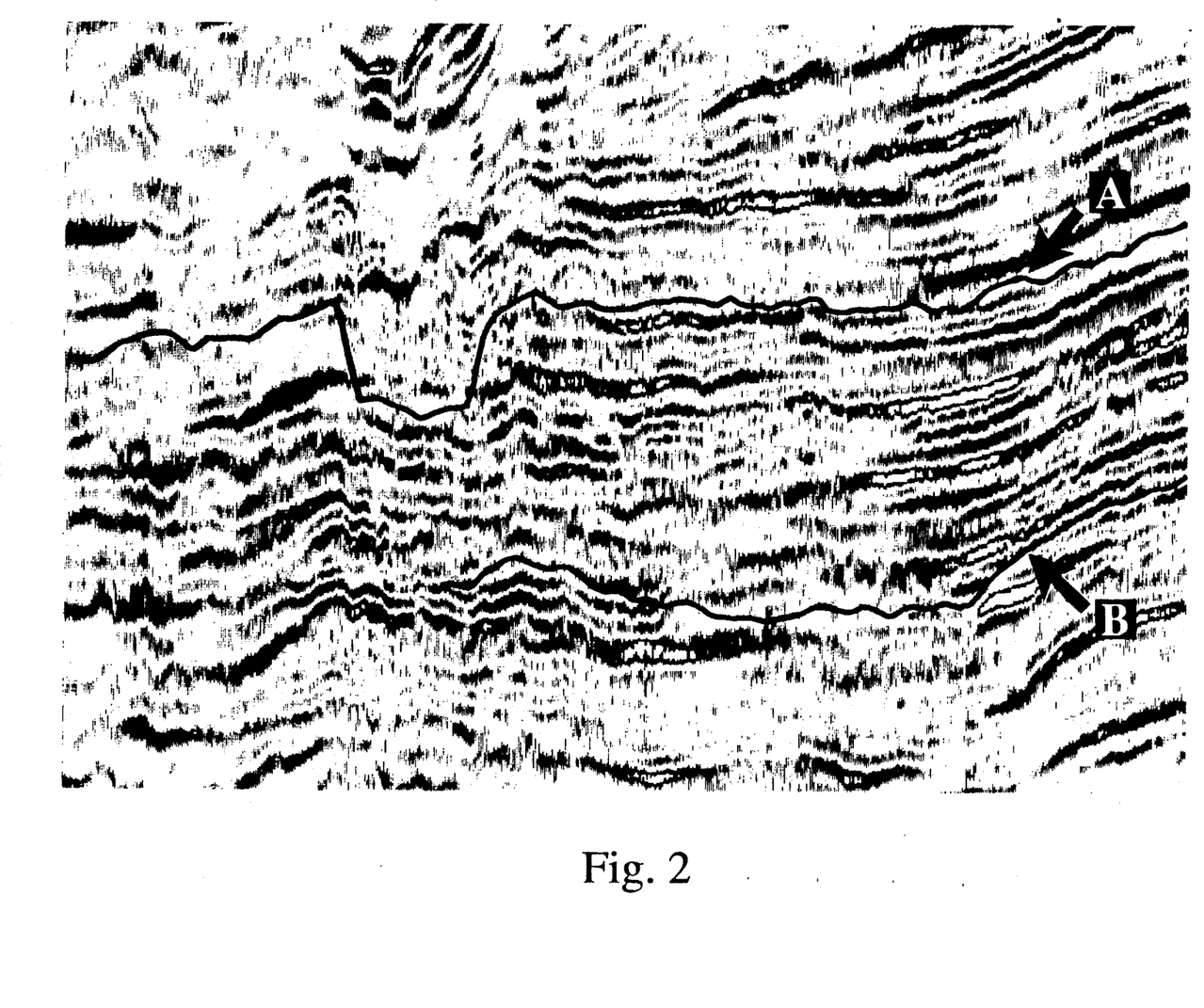
FIG. 2 is a set of seismic data acquired for a region similar to that depicted by the model of FIG. 1.

The present invention describes a novel method of stratigraphic analysis concerned with identifying and characterizing changes in formation materials considered together as a stratum, (i.e., layers of generally similar sedimentary materials deposited during a particular tim and depositional environment as well as in a particular sequence). For example, the aquamarine stratum comprises a sequence of sandstone and shale materials deposited during Oligocene times under fluvial/-deltaic conditions. The plurality of interbedded layers of sandstone and shale materials of the aquamarine stratum is depicted by a stratigraphic model in FIG. 1. Seismic data collected over an area similar to that depicted in FIG. 1 is shown in FIG. 2. In the seismic data of FIG. 2, it can be seen that the aquamarine stratum has both lateral and vertical extent as defined by upper and lower boundaries (A and B, respectively). Moreover, because of changes in geology, lithology and pore fluid content within the aquamarine stratum, it can be seen that the interbedded layering of formation materials in the aquamarine stratum is represented by reflection events defining multiple horizons.

Figure 3:
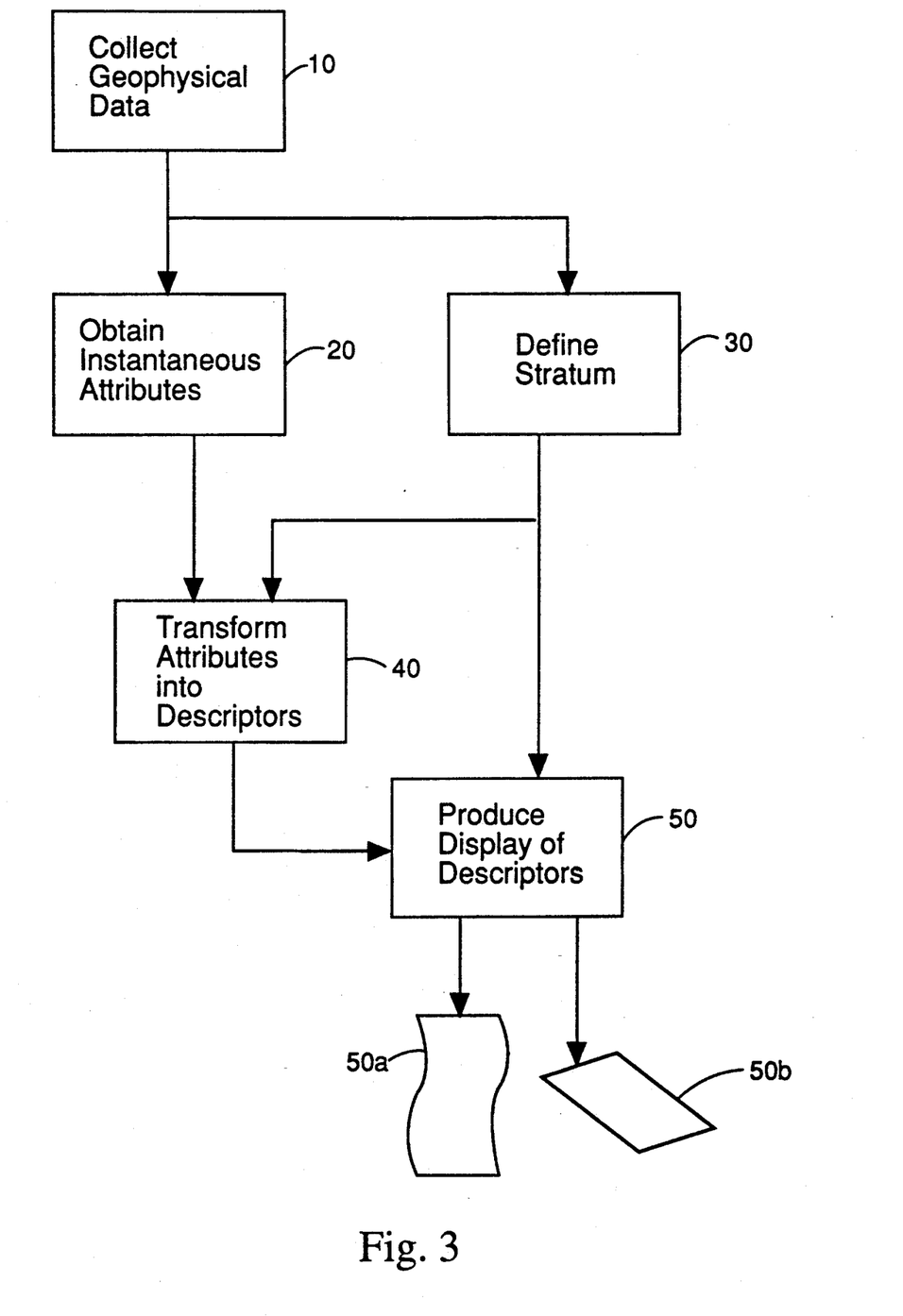
FIG. 3 is a flow diagram of the present invention.
Figure 4:
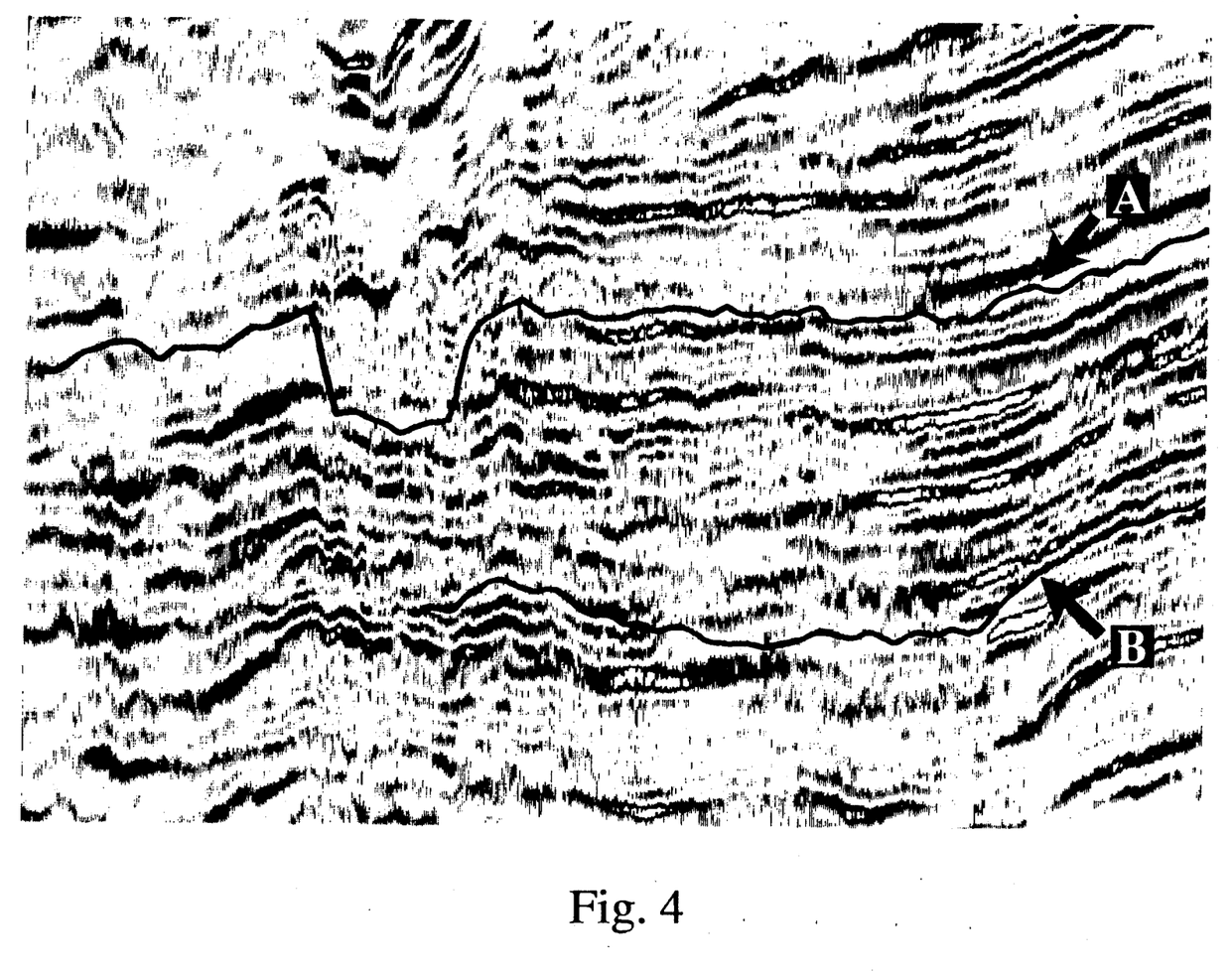
FIG. 4 is a set of seismic data.

Looking now to FIG. 3, the present invention will be described. At step 10, geophysical data are obtained from an area of interest. For purposes of example, the present invention will be described in conjunction with the use of seismic data depicted in FIG. 4. However, it is understood that geophysical data can also include vertical seismic profile, well logging, magnetic, electro-magnetic, and gravity data. While seismic signals comprising the seismic data of FIG. 4 are depicted in the time-domain, those skilled in the art will also appreciate that seismic data in either the depth or frequency-domain can be employed. Preferably, such geophysical data should have an areal extent as can be achieved in a number of well-known ways (e.g. multiple 2-D surveys, wide-line surveys, and 3-D surveys).

Figure 5:
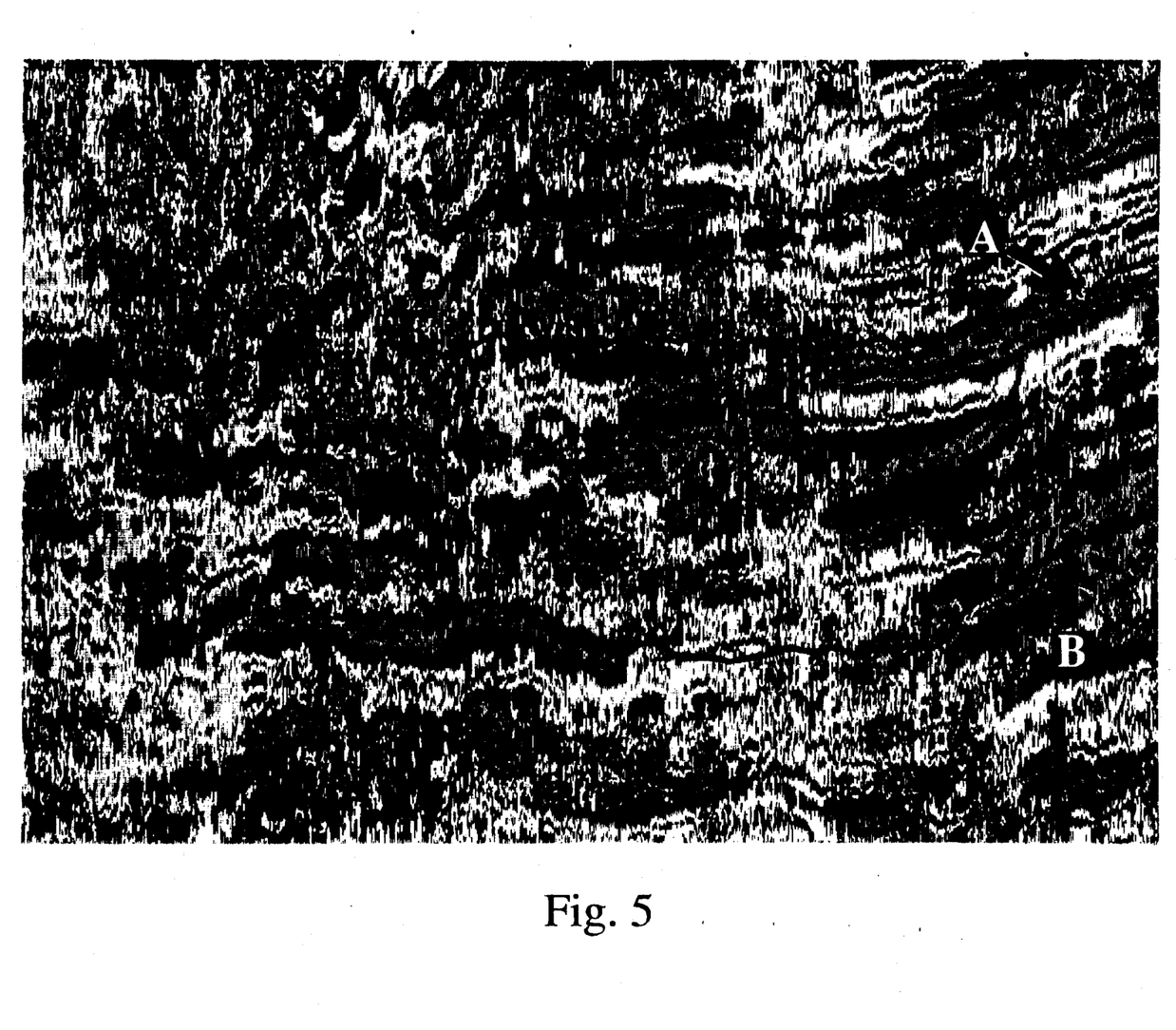
FIG. 5 comprises a color drawing including instantaneous frequency attributes for the seismic data of FIG. 4.

At Step 20, any one of a variety of well-known transformations can be applied to the seismic data to obtain instantaneous attributes which are quantitatively descriptive of some aspect of the wave-like nature of the seismic signals comprising the seismic data. By way of example, FIG. 5, comprises the seismic data of FIG. 4 with measures of the instantaneous frequency attribute overlaid thereon. Table I below provides an exemplary, but not exhaustive, list of such instantaneous attributes, including those suggested by Taner.

TABLE I

Instantaneous Amplitude
Instantaneous Phase
Instantaneous Frequency
Instantaneous Envelope The seismic data can also be scanned for patterns which can be successfully described with an algorithm (e.g., toplap, bottomlap, etc.). Additionally, by analyzing multiple time values and multiple seismic signals, instantaneous spatial attributes such as signal-to-noise ratio (S/N), power, covariance, dip, dip relative to bedding or stratigraphic dip, and wave number can also be obtained. These additional features are also included in the term instantaneous attributes as used herein.

At Step 30, upper and lower boundaries defining a stratum or region of interest in the earth's subsurface can be identified in the seismic data. Typically, each boundary comprises a series of coherent reflection events amongst adjacent seismic signals generally having a lateral or spatial extent as depicted in FIG. 4. In FIG. 4, the upper and lower boundaries (A,B respectively) define both the vertical and lateral extent of the stratum of interest. The vertical separation between boundaries can range from several thousand feet to separation distances approaching zero feet (i.e., in the time domain from 1000 msecs to zero msecs) at the pinchout of the stratum.

At step 40, a descriptor is obtained which is statistically representative of one or more of the instantaneous attributes over the stratum defined by the boundaries (A, B). Lateral and vertical variations of such descriptors within a stratum, can provide substantial basis for discerning subtle trends in the formation materials comprising the stratum. For example, FIG. 6 depicts a descriptor representing the average instantaneous frequency for each seismic signal within the stratum, which has been overlaid on the instantaneous frequency attribute of FIG. 5 to highlight the contrast between the two.

Figure 6:
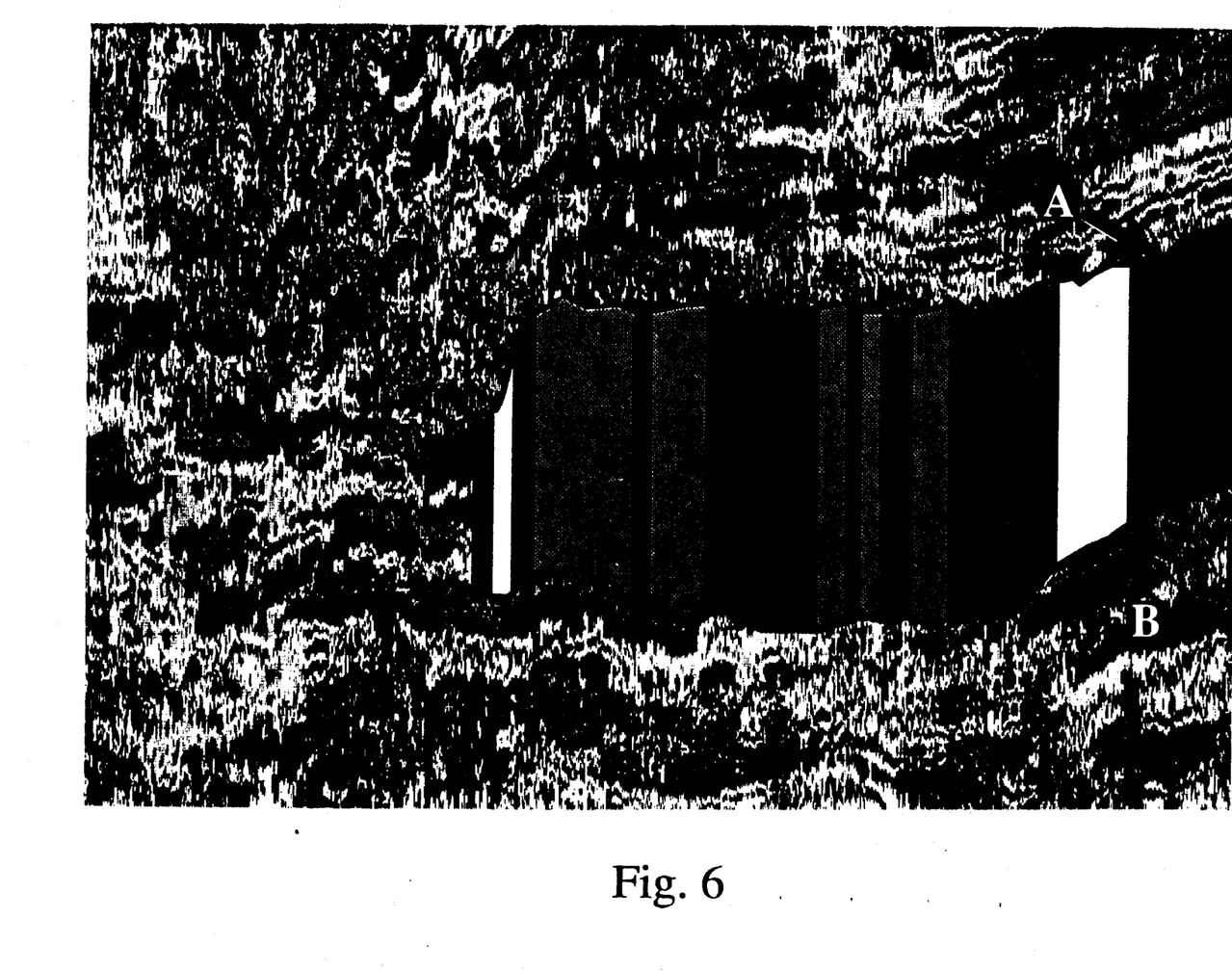
FIG. 6 comprises a color drawing including a descriptor statistical representative of the instantaneous frequency attribute within the stratum defined by boundaries A and B of FIG. 4 and overlaid on FIG. 5.

While an average value of the instantaneous frequency attribute is depicted in FIG. 6, those skilled in the art will appreciate that a variety of other descriptors can be obtained which are statistically representative of the instantaneous attributes within the defined stratum. For example, the descriptor can represent the vertical sum of the instantaneous attributes for the porach seismic signal within the defined stratum. Other statistically representative descriptors such as median, mode, etc., can also be used. Table II comprises an exemplary, but not exhaustive, listing of various descriptors which are statistically representative of an instantaneous attribute.

TABLE II

Figure 8:
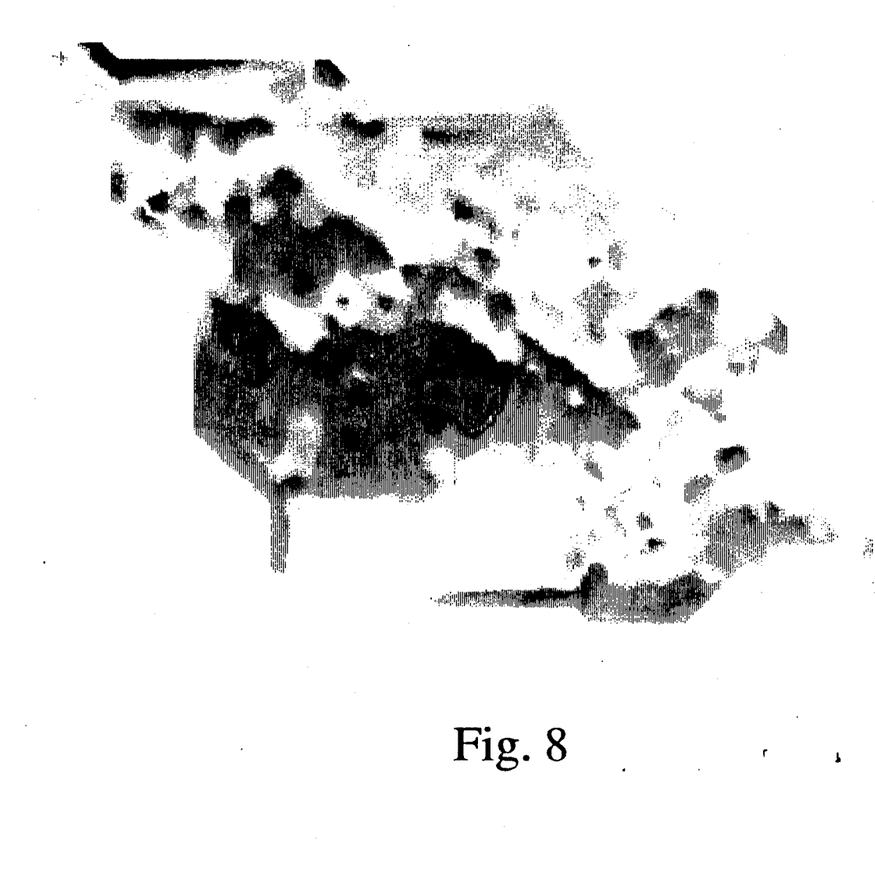
FIG. 8 is a color plan view map of the product of the average instantaneous frequency and the average instantaneous amplitude.

Amplitude:
average absolute amplitude
average positive amplitude
average negative amplitude
average instantaneous amplitude
sum of instantaneous amplitudes
maximum absolute amplitude
maximum positive amplitude
maximum negative amplitude
sum of negative amplitudes
sum of positive amplitudes
  Phase:
average instantaneous phase
  Frequency:
average frequency
maximum frequency
average instantaneous frequency
maximum instantaneous frequency
sum of instantaneous frequencies
  Envelope:
average instantaneous envelope
sum of instantaneous envelope Additionally, combining multiple (i.e., two or more) descriptors through addition, subtraction, multiplication and ratio, or other means can also be successfully employed. Exemplary of such combination, FIG. 8 depicts a product of the average instantaneous amplitude and average instantaneous frequency in map view.

It should be noted at this point that if the geophysical data have been acquired with similar acquisition parameters, spatial changes in the descriptors can be related to spatial changes in the lithology, geology, and pore fluid content of formation materials comprising a stratum. However, descriptors obtained from sets of geophysical data obtained with different acquisition parameters may have to be adjusted to account for such differences. For example, a grid of two dimensional seismic lines may have been employed to acquire seismic data with each seismic line using a different predominant frequency content due to different shooting parameters. The average instantaneous frequency descriptor can be determined at each point where one seismic line crosses another. The difference in values of the descriptor obtained at such intersections can be used to adjust the descriptors for each line up or down to match the rest of the grid. Such process is generally referred to as a mistie analysis and typically employs least-squares error minimization techniques.

At step 50, a display of the descriptors can be produced. Displays of the descriptors can then be employed to identify and characterize both lateral and vertical variations in geology, lithology, and pore fluid content of the formation materials comprising the stratum in the earth's subsurface. In particular, cross-sectional displays can be made at 50a whereby a descriptor statistically the representative of the instantaneous attributes for each seismic signal within the stratum can be superimposed on the stratum of interest in a cross-sectional display of the seismic data. By way of example, the descriptor can be assigned a color from a spectrum of colors whereby each color represents a specified range of values for the descriptor and the descriptor can be superimposed on the stratum of interest as in FIG. 6. The descriptor in FIG. 6 comprises the average instantaneous frequency which has been overlaid on the display of instantaneous frequency from FIG. 5 to highlight differences between the two. Alternatively, the descriptor could have been overlaid on the stratum of interest in a display of the seismic data or simply viewed separate and apart from the seismic data or instantaneous attributes.

Figure 7:
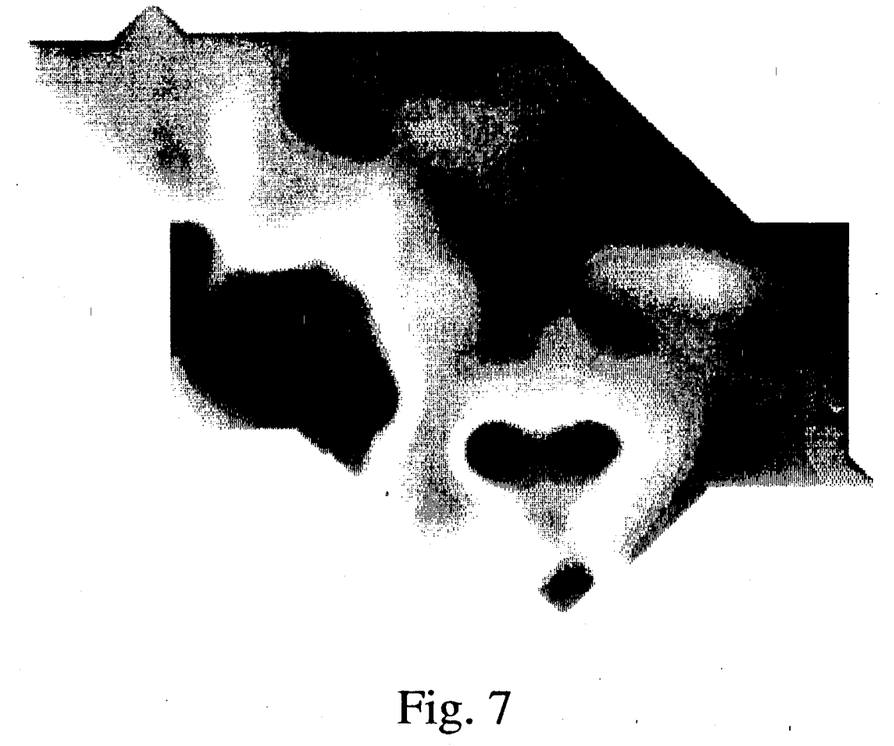
FIG. 7 comprises a color plan view map depicting both lateral and vertical variations in the descriptor representing average instantaneous frequency for the stratum of FIG. 4.

Additionally, at 50b, plan view maps of the descriptor can be produced. For example, FIG. 7 depicts a plan view map of the descriptor representing average instantaneous frequency for a stratum partially defined by the cross-sectional display of seismic data in FIG. 4, whereas FIG. 8 depicts a plan view map of the descriptor representing a product of average instantaneous frequency and average instantaneous amplitude for the stratum depicted in FIG. 7.

The displays at the descriptors, whether in cross-sectional or map view, have been found to substantially assist the explorationists in identifying and characterizing subtle changes in lithology, geology, and pore fluid content of formation materials comprising a stratum in the earth's subsurface.

The foregoing figures and description of the present invention are illustrative and explanatory thereof; however, those skilled in the art will recognize that improvement thereto can be made without departing from the scope of the invention. In particular, a wide variety of additional descriptors will become apparent to those skilled in the geophysical arts; nevertheless, Applicants invention is to be limited only by the scope of the claim attached herewith.

I claim:

1. An improved method of stratigraphic analysis of geophysical data, comprising steps of:
   (a) obtaining geophysical data in the form of seismic information;
   (b) transforming the geophysical data into at least one instantaneous attribute that is quantitatively descriptive of the wave-like nature of said seismic information;
   (c) defining a stratum of interest within the geophysical data, wherein the stratum has both lateral and vertical extend and upper and lower boundaries;
   (d) combining the values of said at least one instantaneous attribute between said upper and lower boundaries within the stratum to form a single descriptor that is representative of formation materials that comprise said stratum; and
   (e) producing a display of said single descriptor over said stratum of interest to identify and characterize changes in formation materials comprising the stratum.

2. The method of claim 1, where in step (e) a display is produced for identifying and characterizing lateral changes in the formation materials comprising the stratum.

3. The method of claim 1, where in step (e) a display is produced of identifying and characterizing vertical changes in the formation materials comprising the stratum.

4. The method of claim 1, wherein said display is produced by overlaying said single descriptor on a cross-sectional display of the stratum.

5. The method of claim 1, wherein the step of producing a display includes producing plan view map of said single descriptor for the stratum.

6. The method of claim 4, wherein the instantaneous attributes are selected from the group including: phase, frequency, amplitude, envelope, wave number, and signal-to-noise ratio (S/N).

7. The method of claim 1, further including the steps of:
(a) transforming the geophysical data into first and second instantaneous attributes that are quantitatively descriptive of the wave-like nature of said seismic information; and
(b) combining the values of said first and second instantaneous attributes between said upper and said lower boundaries to form a new single descriptor for displaying and depicting changes in the formation materials comprising the stratum.

8. An improved method of stratigraphic analysis of seismic data, comprising the steps of:
(a) obtaining seismic data from a predetermined area;
(b) defining a stratum having both lateral and vertical extent and upper and lower boundaries within the seismic data;
(c) transforming the seismic data into at least one instantaneous attribute quantitatively descriptive of at least one of the amplitude, phase, frequency and envelope of said seismic data;
(d) combining the values of at least one instantaneous attribute between said upper and said lower boundaries for the stratum into a single descriptor that is representative of formation materials that comprise the stratum; and
(e) producing a pictorial display of at least said single descriptor between said upper and said lower boundaries of said stratum for identifying and characterizing changes in the formation materials comprising the stratum.

9. The method of claim 8 wherein step (e) comprises: producing a plan view map of said single descriptor for identifying and characterizing variations in lithology, geology, and pore fluid content of the formation materials comprising the stratum.

10. The method of claim 8, wherein step (e) comprises: producing a cross-sectional view of said single descriptor for identifying and characterizing variations in lithology, geology, and pore fluid content of the formation materials comprising the stratum.

11. The method of claim 8, wherein said single descriptor comprises a combination of at least two separate instantaneous attributes between said upper and said lower boundaries.

12. The method of claim 11, wherein said single descriptor is produced by taking at least one of the product, sum, difference and ratio of said at least two instantaneous attributes.

13. The method of claim 8, wherein said single descriptor is selected to be statistically representative of the values of at least one instantaneous attribute between said upper and said lower boundaries.

14. The method of claim 8, wherein the step of combining the values of at least one instantaneous attribute is selected from the group of statistical combinations including: mean, mode, median, and vertical sum.

15. The method of claim 8, wherein the display of step (e) is produced for identifying and characterizing lateral changes in the lithology, geology and pore fluid content of formation materials comprising the stratum.

16. The method of claim 8, wherein the display of step (e) is produced for identifying and characterizing vertical changes in the lithology, geology and pore fluid content of the formation materials comprising the stratum.

* * * * *

UNITED STATES PATENT AND TRADEMARK OFFICE
CERTIFICATE OF CORRECTION

PATENT NO. : 5,226,019
DATED : July 6, 1993
INVENTOR(S) : Michael S. Bahorich

It is certified that error appears in the above-indentified patent and that said Letters Patent is hereby corrected as shown below:

| Col. | Line | |
|------|------|---|
| 3 | 41-42 | "similar sedimentary materials deposited during a particular tim and depositional environment" should read --similar sedimentary materials deposited during a particular time and depositional environment-- |
| 4 | 63-64 | "the instantaneous attributes for the porach seismic signal" should read --the instantaneous attributes for the portion of each seismic signal-- |
| 6 | 40-41 | "lateral and vertical extend" should read --lateral and vertical extent-- |
| 6 | 55-56 | "a display is produced of identifying" should read --a display is produced for identifying-- |

Signed and Sealed this

Twenty-ninth Day of August, 1995

Attest:

BRUCE LEHMAN

*Attesting Officer*     *Commissioner of Patents and Trademarks*